Jan. 21, 1947.  F. B. LOUCKS, JR  2,414,750
OXY-ACETYLENE CUTTING MACHINE
Filed May 6, 1944  2 Sheets-Sheet 1

INVENTOR
FRED B. LOUCKS, JR.
BY Gerald P. Welch
ATTORNEY.

Jan. 21, 1947. F. B. LOUCKS, JR 2,414,750
OXY-ACETYLENE CUTTING MACHINE
Filed May 6, 1944 2 Sheets-Sheet 2
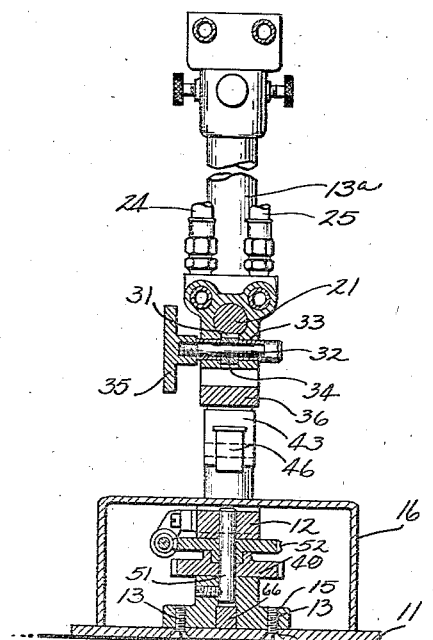
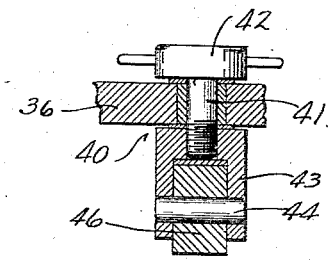
Fig. 5.
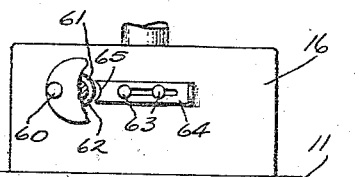
Fig. 6.
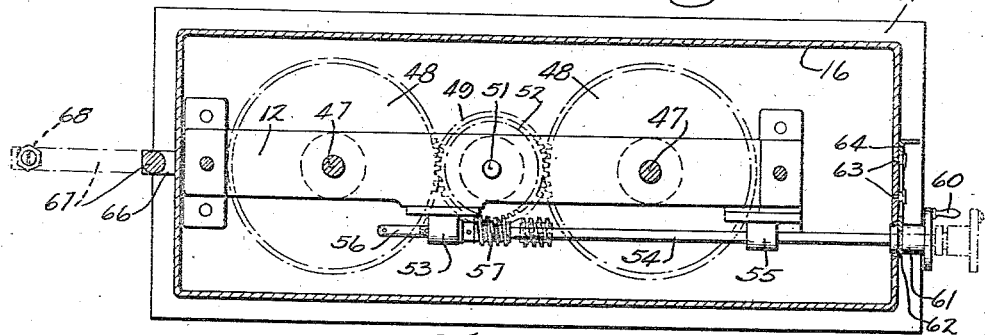
Fig. 4.
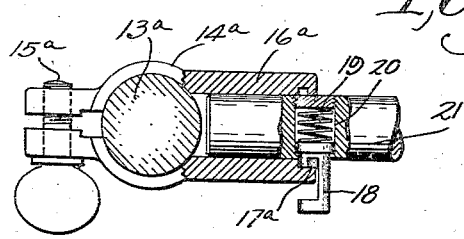
Fig. 7.
Fig. 8.
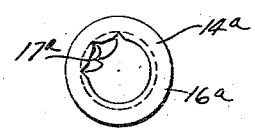
Fig. 9.
INVENTOR
FRED B. LOUCKS, JR.
BY
Gerald P. Welch
ATTORNEY Patented Jan. 21, 1947

2,414,750

UNITED STATES PATENT OFFICE 2,414,750

OXYACETYLENE CUTTING MACHINE

Fred B. Loucks, Jr., Milwaukee, Wis.

Application May 6, 1944, Serial No. 534,469

2 Claims. (Cl. 33—27)

This invention relates to oxy-acetylene cutting machines, and more particularly to a novel and compact machine for holding and guiding a gas torch during metal cutting operations. It will be understood that any other gas usable in a cutting operation may be employed, such as, for instance, the oxyhydrogen flame.

A object of the invention is to provide a compact machine of the type which may be placed directly on the material to be cut. Other devices of the type now in use require cumbersome tracks or other assisting structures for their efficient utilization.

Another object of the invention is to provide novel means for guiding a gas torch with provision for starting the flame inside or outside the pattern cut, in accord with the desire of the operator to save free of marring, the inner or outer portion of the blank.

Another object is to provide work centering means of precision type which may be retracted and collapsed in a manner so as not to impede the work of the machine, after the center has been properly established.

Other and further objects of the invention will appear as the description proceeds, reference being had to the accompanying drawings, in which:

Fig. 3 is a view partly in elevation and partly in section taken on line 3—3 of Fig. 1.

Fig. 4 is a horizontal sectional view of the machine.

Fig. 5 is a vertical sectional view through one of the pivot connections of the device.

Fig. 6 is a view in elevation of the retractable detent for securing the worm gear shaft.

Fig. 7 is a view in horizontal section of the torch positioning means.

Fig. 8 is a detail view of the latch in perspective.

Fig. 9 is an end view of the circular latch keeper.

Figure 1:
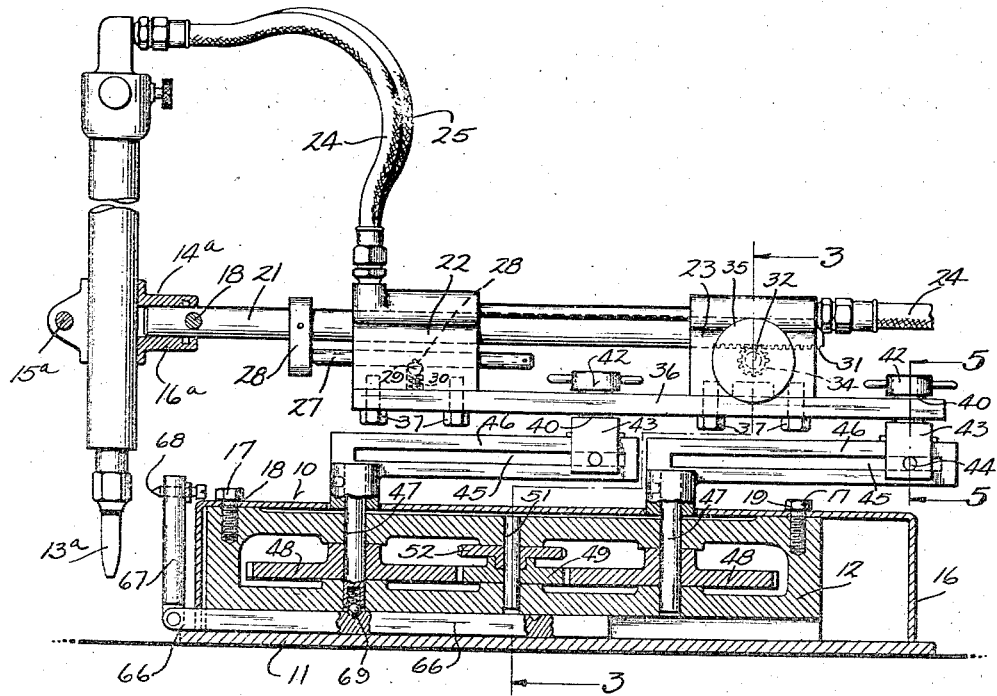
Fig. 1 is a side view partly in elevation and partly in section of a machine embodying my invention.
Figure 2:
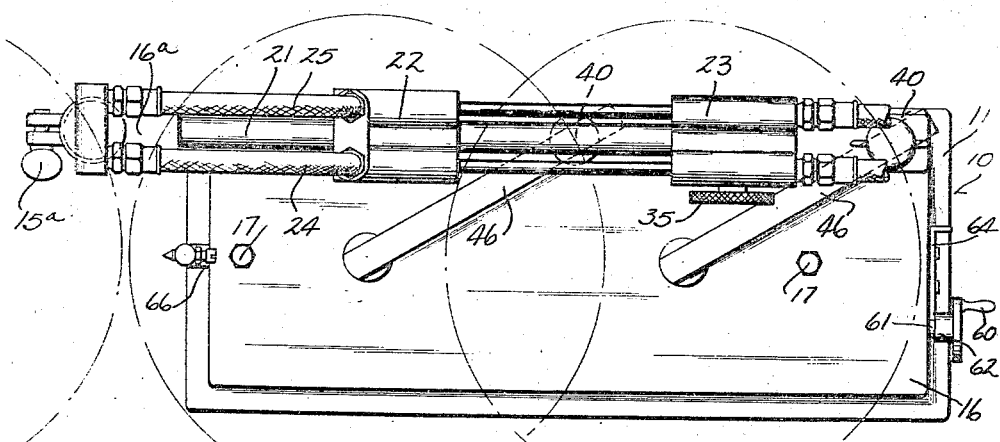
Fig. 2 is a plan view in elevation of the device with broken lines to indicate the orbit of travel of rotatable members thereof.

Referring more particularly to the drawings, the numeral 10 refers to the device generally, having a rectangularly formed base 11, and the frame 12 fixed thereto by means of flat head screws 13, inserted upwardly through the base apertures at 14 thereof, into the threaded bores at 15 of said frame 12.

A casing 16 is held securely in place by means of the bolts 17 threadingly engaged in the top side of the frame 12 at 18 and 19 thereof.

A gas cutting torch 13 of conventional design is held in the turnable holder 14 and fixed against vertical movement by means of the set schew 15. The holder 14 has a sleeve portion 16, indented interiorly as at 17 of Fig. 9 to accommodate the spring detent 18 held with its spring 19 in the bore 20, adjacent the frontal end of the rod 21.

The rod 21 is held with a sliding fit in the sleeves 22 and 23, which latter also carry the gas and oxygen conduits 24 and 25. A bracket 26 is dependingly secured to rod 21 and rigidly secures the auxiliary bar 27 having an indentation at 28 of the lower surface thereof.

Sleeve 22 houses centrally of its lower portion the ball detent 29 and coiled compression spring 30 which normally holds said detent within the indentation at 28 of bar 27.

Rod 21, for a portion of its length, and through sleeve 23, is provided with the downwardly disposed rack 31. A shaft, 32, is journalled at 33 of sleeve 23 and carries fixed thereon the pinion 34, engaged within the rack 31, and the adjusting wheel 35.

Sleeves 22 and 23 are mounted spacedly as shown on the bar 36 and secured thereto by means of the bolts 37. The bar 36 journals the two spaced pivot bearings 40, held in place by the bolts 41 with adjusting heads 42, which also pivotally secure the travellers 43 to the bar 36 in the manner shown in Fig. 1. The travellers 43 carry the transversely mounted pins 44 which engage within the laterally opening slots at 45 in the crank arms 46 fixed to the upper ends of shafts 47 journalled vertically in the frame 12 and carrying the gears 48 engaged with the pinion gear 49 secured to shaft 51 commonly with worm gear 52.

A bracket 53 is secured laterally on frame 12 and journals the shaft 54 journalled adjacent its handle or crank end by a similar bracket 55. The inner end 56 of shaft 54 extends through the bracket 53 a substantial difference to permit a longitudinal withdrawal movement thereof for the purpose of disengaging the worm wheel 57 from the worm gear 52 when it is desired to move the crank arms and associated assembly independently of the worm wheel.

The shaft 54 carries at its outer end the crank 60 having the integral barrel 61 formed with a groove 62. Adjacent to the crank handle on the outside of casing 16, a pair of horizontally aligned pins 63 secure the slidable detent 64 slotted at 65 for horizontal movement on the pins and cut arcuately at an end thereof to engage in the groove 62 for the purpose of holding the shaft 54 in position to maintain the mesh of worm wheel 57 with the worm gear 52.

The frame 12 is squarely grooved mediately longitudinally of its bottom surface to accommodate the slidable bar 66, which latter has at its frontal end the pivoted arm 67 adapted to pivot upwardly out of the way during a cutting operation and carrying the marker point 68. The bar 66 is indented spacedly on its top surface to receive the spring detent 69 which marks the limits of the extended and retracted movement of said bar.

In operation, the machine is placed on the material to be cut, the bar 66 is extended fully and the marker point 68 will then indicate the axial point of any circular movement of the torch 13. The travellers 43 are adjusted and fixed to conform to the size of the circular cut desired according to the indicia 70 on the crank arms 46.

Figure 10:
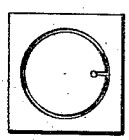
Fig. 10 is a plan view of a circular kerf showing inside entry of the cutting flame.
Figure 11:
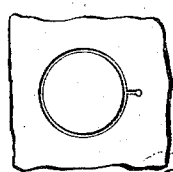
Fig. 11 is a similar view of a kerf in a plate showing entry has been made from the outside by the cutting flame.

A gas torch makes a relatively larger hole when it is started on the cutting operation, and for this purpose, the pinion 34 and rack 31, the former actuated by the adjusting wheel 35, are provided to start the cut either inside or outside of the normal circular cut, as shown in Figs. 10 and 11. After the wheel has been turned back to replace the ball detent 29 within the indentation at 28 of bar 27, the torch can be urged in its normal circular path by turning the crank 60 actuating the worm wheel 57 to turn the worm gear 52, thus rotating the pinion gear associated therewith on shaft 51. Rotation of the pinion gear turns the gears 48 meshed therewith and causes a rotating movement of the arms 46, thus imparting a like rotating movement to the rod 21 which carries the torch 13. The radius of the circular path of the torch 13 may be changed by adjusting the travellers 43 on bar 36.

It will be understood that the device is capable of many modifications in structure and design, without departing from the spirit of the invention, within the scope of the appended claims.

I claim:

1. In a device of the character described, a centering device comprising a bar slidably mounted for extension and retraction, spring detents for releasably securing said bar at the limits of said movement, an arm pivoted for upward movement at the outer end of said bar and forming a continuation thereof, a marker at the outer end of said arm and disposed to extend vertically downwardly when said arm is aligned extendedly with said bar.

2. A device of the character described including a frame, a shaft held therein adapted for manual rotation with a worm mounted adjacent the inner end thereof, a worm gear connecting with said worm, a pinion gear fixed to turn identically with said worm gear, a pair of oppositely mounted gears meshed with said pinion gear and mounted on turnable vertical shafts in said frame, a pair of horizontal arms fixed to the upper ends of said vertical shafts and having longitudinal laterally opening slots therein, a pair of travelers engaged through said slots and riding on the top sides of said arms, releasable means for fixing said travelers on said arms, a bar carried by said travelers and maintaining them in fixed spaced relation, a pair of horizontal sleeve members spacedly fixed on said bar, a rod movable longitudinally therethrough, manual means for moving said rod relatively to said bar, and an instrument holder on the frontal end of said rod.

FRED B. LOUCKS, JR.